Figure 1:
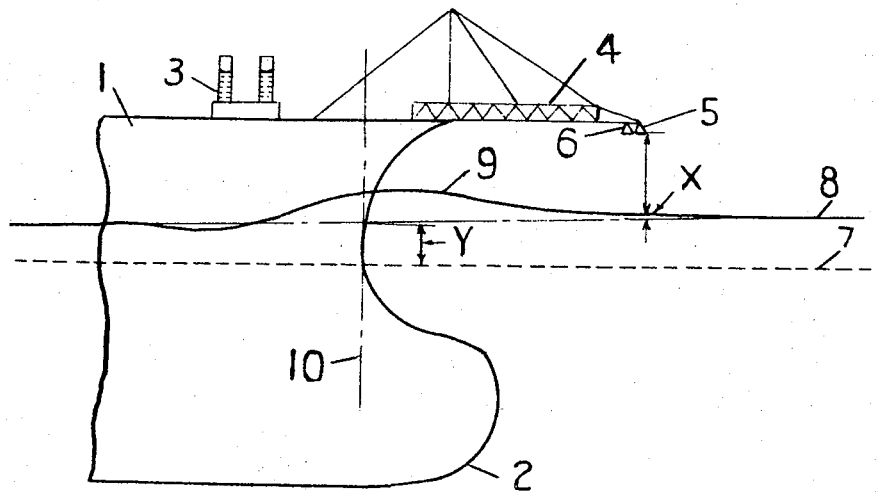

United States Patent [19]
Ferguson

[11] 3,721,951
[45] March 20, 1973

[54] NAVIGATIONAL INSTRUMENTS FOR SHIPS

[75] Inventor: Archibald McIntyre Ferguson, Cardross, Scotland

[73] Assignee: The University Court of the University of Glasgow, Glasgow, Scotland

[22] Filed: Sept. 9, 1970

[21] Appl. No.: 70,828

[30] Foreign Application Priority Data

Sept. 16, 1969   Great Britain.....................45,475/69

[52] U.S. Cl.......................................340/3, 340/1 R
[51] Int. Cl.................................................G01s 9/66
[58] Field of Search.....................340/1 R, 3 R, 3 PR

[56] References Cited

UNITED STATES PATENTS 2,960,678   11/1960   Beard et al...........................340/1 R
2,083,344   6/1937   Newhouse et al......................340/3 R Primary Examiner—Benjamin A. Borchelt
Assistant Examiner—H. Tudor
Attorney—Larson, Taylor and Hinds

[57] ABSTRACT

A navigational instrument for a ship incorporates an echo device arranged to measure the distance from a fixed part of the ship to the surface of the water at a point in advance of the ship. It includes a clinometer device arranged to measure the angle of fore and aft inclination of the ship from its static position and feed a corresponding signal to a computer together with the signal from the echo device. Indicating means receive the output from the computer which is in the form of an indication of the amount of the depression of the selected part of the ship and show such indication as a visual signal. The instrument may also incorporate a hog and sag clinometer providing a measure of any hog and sag present in the ship the output of said clinometer being also fed to the computer for correction of the output signal. The instrument may also incorporate means for feeding to the computer a signal which indicates the speed of the ship.

13 Claims, 3 Drawing Figures

NAVIGATIONAL INSTRUMENTS FOR SHIPS

This invention relates to navigational instruments for ships.

The introduction of very large vessels particularly oil tankers and bulk carriers has produced for such ships problems of navigation even in what was formerly regarded as the open sea. As a 200,000 ton ship may well have a loaded draught of 60 feet to 70 feet many a channel which was once considered perfectly safe for all ships provides a clearance between the bottom of such a large ship and the bottom of the channel which calls for extra care in navigation. This difficulty is aggravated by an effect which takes place when a ship is on the move in water the depth of which is not much greater than the draught of the ship. This effect may be referred to as a Bernouilli effect. As a ship moves over the sea bottom in a shallow channel certain hydrodynamic forces come into play in the passage between the bottom of the ship and the sea bottom. More specifically the relative movement of the ship to the water in this passages causes a reduction in pressure in the passage as the water is accelerated relatively to the ship's bottom through the passage. The reduced pressure in the passage below the ship causes the ship to be forced downwardly and thus to sink more deeply in the water. This effect may be augmented by the effect of the bulb which is a normal feature of the bow of a large cargo ship. The effect may be further augmented by the thrust from the ship's propellers. In aggregate it has been found by experiment that when a 200,000 ton ship is moving forward at the common service speed of about 14 knots in a comparatively shallow waterway the bow may become depressed by as much as 8 feet. The stern is usually depressed also but customarily to a less extent. It is an object of the present invention to provide an instrument which will give an indication on the bridge of the ship or at any other desired position of the amount of such depression and which can in fact be arranged to give a direct reading of the clearance between the lowest part of the ship and the sea bed.

A navigational instrument according to the invention incorporates an echo device arranged to measure the distance from a fixed part of the ship to the surface of the water at a point in advance of the ship and generate a corresponding signal, a clinometer device arranged to measure the angle of fore and aft inclination of the ship from the static position i.e. its position when at rest and generate a corresponding signal, computing means to receive the two signals and compute the amount by which at least one selected part of the ship is depressed from its static position and produce a corresponding computed output signal corresponding with said amount and indicating means arranged to receive the computed signal and provide a visual indication of the amount of the depression of the selected part of the ship.

The computing means may be arranged to compute separately and simultaneously the amounts by which the bow and the stern of the ship are depressed, the indicating means being arranged to provide separate visual indications of the depressions of the bow and the stern.

The echo device may be arranged to project sound or electro-magnetic waves which are reflected from the surface of the water to be received as an echo by the device. Where an electromagnetic wave is employed it may be in the radio frequency or optical frequency band.

The echo device may include a boom arranged to project forwardly from the bow of the ship, the wave projector and receiver being mounted on the tip of the boom. The wave projector may be a laser. In an alternative construction the boom may support two light guides, e,g, bundles of optional fibers the outer ends of which are downwardly turned to face the surface of the water while the inner end of one is arranged to receive the output of a laser, and the inner end of the other is directed towards a light-sensitive device.

The clinometer device may incorporate two vertical cylindrical tubular columns arranged to contain a liquid, the columns being spaced in a fore and aft direction and being connected to a differential pressure-sensitive device, the difference in the hydrostatic pressures in the two columns providing an indication of the difference in liquid levels in the two columns and thus of the fore and aft inclination of the ship.

The computing means may be arranged to provide an electrical or a mechanical output signal, the indicating means being correspondingly an electrical or a mechanical device. As it is desirable that the instrument should provide an indication of the prevailing conditions of depth available below at least one selected point, usually the lowest point of the ship or at two points such as the bow and the stern as a direct reading the indicating means may be arranged with a pointer for the or each selected point on the ship's bottom movable according to the computed signal received by the instrument against a scale calibrated in appropriate units of draught, said scale being independently manually movable so that it can be set to a datum position in which the pointer indicates the previously ascertained draught under the immediate conditions of load while the ship is stationary. The position of the pointer at any instant when the ship is under way will then indicate the true draught of the ship at that instant.

The indicating device may also be fitted with a manually movable depth scale calibrated to the same scale as the scale of the draught, said depth scale being mounted on the movable scale of draught and being itself independently movable relative to that scale in the same direction. The use of this latter scale will be described later.

The or each pointer of the indicating means is preferably coupled to a one-way dashpot in such a way that the pointer is permitted to respond quickly to a rising signal, but is damped when responding to a reducing signal. The indicating device thus tends to indicate maximum movement of the particular point on the ship's bottom. Also temporary effects such as those caused by waves do not cause large and rapid swings of the pointers and thereby provide false readings or readings difficult to interpret.

The indicating means may be coupled to recording devices so that a permanent record is kept of the clearance between the bottom of the ship and the sea bed, at least during the period when the ship is in shallow water.

In certain conditions of loading and/or sea swell a ship may deflect in hog or sag and this will have the effect of altering to some extent the amount of depression calculated for the stern. Normally the amount of such hogging or sagging is small compared with the depression of the bow of the ship under way and therefore its effect can be disregarded. If it is desired that the amount of hogging and sagging should be taken into account means to provide an indication of the amount of hogging or sagging can be provided to issue a correcting signal to the instrument. Such means may take the form of two clinometers attached to the ship's structure one forward and one aft of amidships, the difference in the readings provided by the two clinometers when taken with the known dimensions of the ship providing an indication of the amount by which the midship section has moved upwardly or downwardly in relation to the bow or the stern. The hog and sag signal is fed to the computing means which latter corrects correspondingly the output signal.

In a large ship the water is distrubed in advance of the ship for some considerable distance often more than 40 feet. Preferably the boom should be long enough to hold the echo device far enough in advance for the signal directed to the surface of the water to meet undisturbed water. Where this is not possible a correction for the amount of rise of the water surface in advance of the ship at the point where the signal reaches the surface may be made. This will vary according to the speed of the ship but such a correction may be applied to the indication given by the instruments as a separate correction or the ship's speed indicator may be linked to the computing means so that the computing means will provide the desired correction at each speed. The computing means will be previously programmed to do this, the necessary information having been obtained either in tank tests of a model of the ship or during full scale trials.

Figure 2:
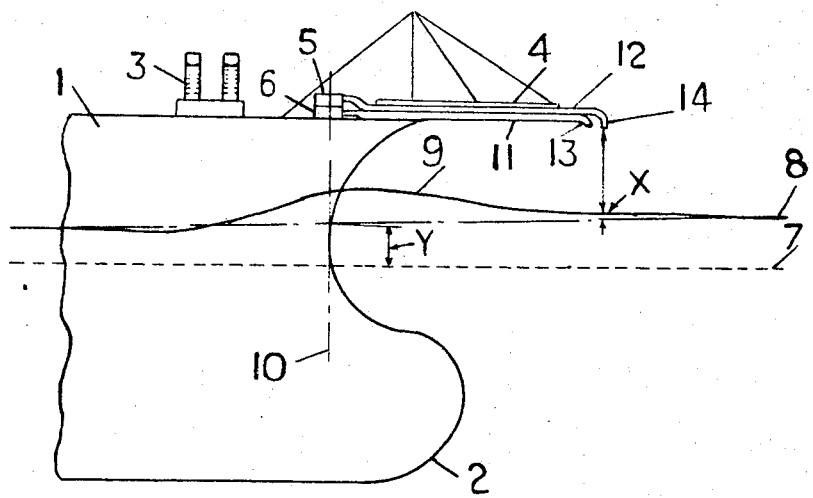
Figure 3:
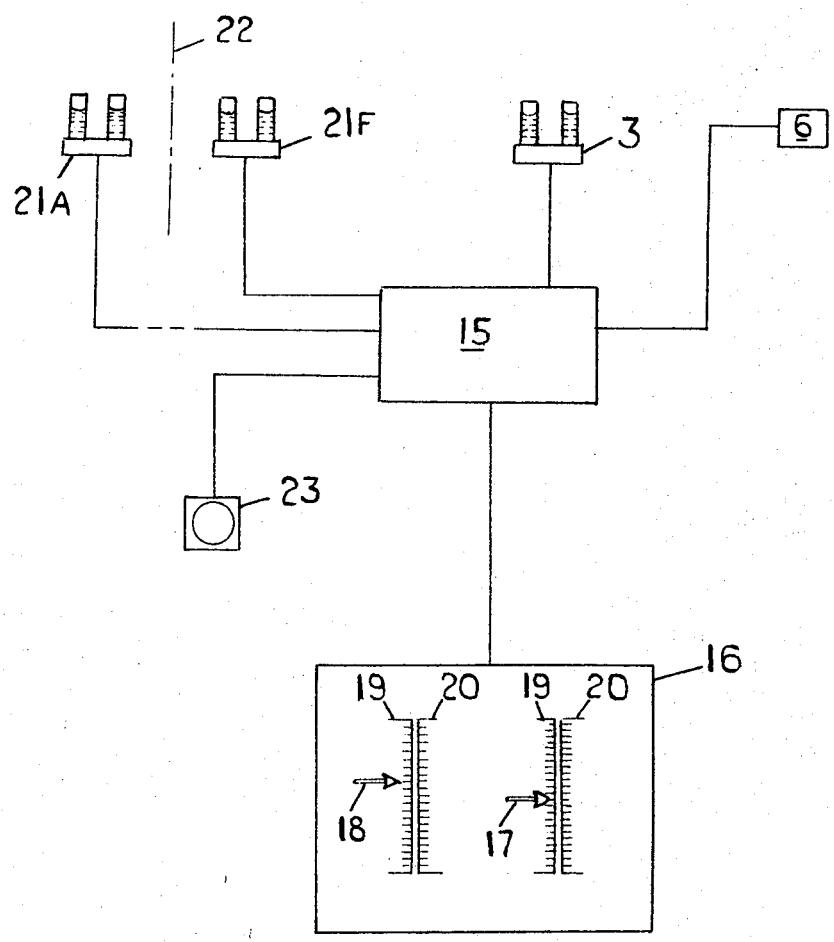

A practical embodiment of the invention is illustrated in the accompanying diagrammatic drawings in which FIG. 1 is a side elevation of the bow of a ship fitted with a wave projector mounted on the tip of the boom, FIG. 2 is a side elevation of the bow of a ship fitted with light guides in the form of bundles of optical fibers connected to a laser and a light-sensitive device respectively and FIG. 3 is a diagram showing the working relationship of the various parts.

In the drawings, and referring particularly to FIG. 1, 1 denotes a bow portion of a ship fitted with a bulb 2. 3 denotes a clinometer device arranged to measure the angle of fore and aft inclination of the ship and generate a signal corresponding with the angle of inclination. 4 denotes a boom projecting forwardly of the ship's bow and carrying at its outer end a directional electromagnetic wave transmitter or an acoustical wave transmitter 5 arranged to direct the transmitted wave downwardly. The outer end of the boom 4 also carries a receiver 6 for an echo of the wave emanating from the transmitter 5. 7 denotes the position of the water line when the ship is at rest, 8 denotes the position of the water line when the ship is in motion and 9 denotes the bow wave caused by the forward motion of the ship. The dimension X denotes the artificially raised water line caused by the pressure rise transmitted forwardly from the bow of the ship at a point directly below the tip of the boom 4 and Y denotes the amount by which the bow has sunk at the forward perpendicular 10 during forward motion of the ship.

Referring to FIG. 2, 11 and 12 denote bundles of optical fibers having their outer ends turned downwardly at 13 and 14 respectively, the bundles of fibers 12 arranged to receive the output of a laser or other light source constituting the wave transmitter 5 and the bundle of fibers 11 being directed towards a light-sensitive device constituting the receiver 6.

In FIG. 3, 15 denotes a central computing means to which the receiver 6 and the clinometer 3 are connected, the output of the computing means being fed to a visual indicating device 16 having a pointer 17 arranged to indicate details of the vertical position of the ship's bow and a pointer 18 arranged to indicate details of the vertical position of the ship's stern. 19 denotes manually movable depth scales. 21F and 21A denote hog and sag clinometer devices located forward and aft of the amidships line 22 of the ship and arranged to provide to the computing means 15 details of the extent of hog or sag in the ship and 23 denotes an indicator of the speed of the ship also connected to the computing means, 15 to provide a signal thereto.

In practice, when the vessel is in sailing conditions of load and while it is still at rest the manually operable scales 19 of draught on the indicating device 16 are adjusted until the actual draughts of the vessel 1 at the bow and at the stern are indicated opposite the respective pointers 17 and 18. Additionally in the indicating device the minimum depth of the water for a predetermined distance ahead as ascertained from a chart is indicated by moving the other manually operable scales 20 so that the minimum ascertained water depth is also indicated opposite the pointers 17 and 18. The actual distance to the sea bed below the point on the ship's bottom represented by each pointer 17 and 18 may thus be read directly on the indicating device. When the ship starts moving the Bernouilli effect already referred to between the ship's bottom and the sea bed causes the ship to move downwardly so that the draught increases, i.e. the original water level at rest as indicated at 7 rises towards the position indicated by 8, while a thrust resulting from the forward motion of the ship and operating on the hull structure tends to cause the bow to become further depressed and this action is frequently augmented by the propeller thrust. As the bow becomes depressed under all these forces the echo device 5 moves nearer the surface of the water and a signal indicating this change of height is sent by the receiver 6 to the computing means 15. As the bow becomes depressed the ship tilts forwardly slightly and the clinometer device 3 detects the tilt and sends a tilting signal also back to the computing means 15 which latter operates to produce a computed output signal which is a function of the true amount by which the bow has become depressed. The computing means also computes from the signals received the amount by which the stern has changed elevation and produces another output signal which is a function of such change of elevation. These signals are sent to the indicating means 16 and the pointers 17 and 18 move over the scales 19 and 20 amounts corresponding to the vertical movements of the bow and of the stern. The new figure for minimum distance to the sea bed below the bow and below the stern can then be directly read off on the scales 20. Where the echo device is not mounted far enough ahead of the bow to be beyond the bow effect the computing means takes account of the signal from the speed indicator 23 of the ship and operates to apply the previously ascertained correction so that the false reading at the bow is allowed for. The signals from the two clinometer devices 21F and 21A are sent to the computing means 15 and a correction for hogging and sagging is also applied.

Many channels which were formerly regarded as too hazardous for large ships may be used safely by a ship fitted with the instrument of the invention because the effective clearance below the ship's bottom can be increased to a safer figure by reducing the speed of the ship, the instrument indicating when a safe speed is reached.

It will be noted that the depth at the stern is computed from the bow signal. This is because the water at the stern when the ship is under way is too much disturbed to permit effective use of an echo device at the stern.

A great advantage of the instrument of the device over an echo sounder is that the echo sounder informs of the conditions as they occur whereas the instrument of the invention can provide an advance indication of what will occur so that avoiding action can be taken if considered necessary.

What is claimed is:

1. A navigational instrument for a ship incorporating an echo device arranged to measure the distance from a fixed part of the ship to the surface of the water at a point in advance of the ship and generate a corresponding signal, a clinometer device arranged to measure the angle of fore and aft inclination of the ship from its static position and generate a corresponding signal, computing means to receive the two signals and compute the amount by which at least one selected part of the ship is depressed from its static position and produce a corresponding computed output signal corresponding with the said amount and indicating means arranged to receive the computed signal and provide a visual indication of the amount of the depression of the selected part of the ship.

2. An instrument as claimed in claim 1 in which the computing means is arranged to compute separately and simultaneously the amounts by which the bow and the stern of the ship are depressed and the indicating means is arranged to provide separate visual indications of the depressions of the bow and the stern.

3. An instrument as claimed in claim 1 in which the echo device is arranged to project sound waves.

4. An instrument as claimed in claim 1 in which the echo device is arranged to project electro-magnetic waves.

5. An instrument as claimed in claim 1 including a boom arranged to project forwardly from the bow of the ship, the echo device being mounted on the tip of the boom.

6. An instrument as claimed in claim 4 in which a laser is provided to generate the electro-magnetic waves.

7. An instrument as claimed in claim 1 in which the echo device includes a boom arranged to project forwardly from the bow of the ship and two light guides are mounted on the boom, the outer ends of the light guides being downwardly turned to face the surface of the water, a laser is arranged to direct its beam into the inner end of one light guide and a light-sensitive device is arranged to receive light issuing from the inner end of the other light guide.

8. An instrument as claimed in claim 1 in which the clinometer device incorporates two vertical cylindrical tubular columns arranged to contain a liquid, the columns being spaced in a fore and aft direction and a differential pressure-sensitive device to which the colums are connected.

9. An instrument as claimed in claim 1 in which the indicating means incorporates a pointer for each selected point on the ship's bottom at which a depth measurement is required, said pointer being movable according to the computed signal received by the instrument and at least one scale against which said pointer is movable, said scale being independently manually movable and being calibrated in the appropriate units.

10. An instrument as claimed in claim 9 in which each pointer of the indicating means is coupled to a one-way dashpot in such a way that the pointer is permitted to respond quickly to a rising signal, but is damped when responding to a reducing signal.

11. An instrument as claimed in claim 1 in which a recording device is coupled to the indicating means.

12. An instrument as claimed in claim 1 incorporating two hog and sag clinometer devices attached to the ship's structure one forward and one aft of amidships and arranged to provide output signals, the computing means being arranged to receive said signals and correct correspondingly its own output signal.

13. An instrument as claimed in claim 1 in which the computing means is arranged to receive a signal indicative of the ships speed and make a correction in its own output signal in accordance with the amount by which the ship's draught is changed at the indicated speed.

* * * * *